July 15, 1941.                    G. W. OAKES                    2,249,665
REMOVABLE TIRE CHAIN
Filed March 12, 1941
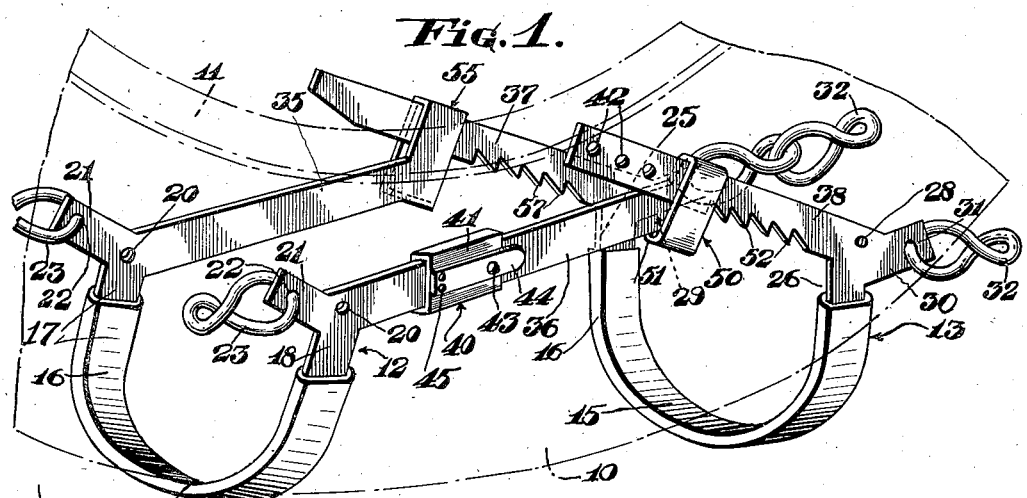
Fig. 1.
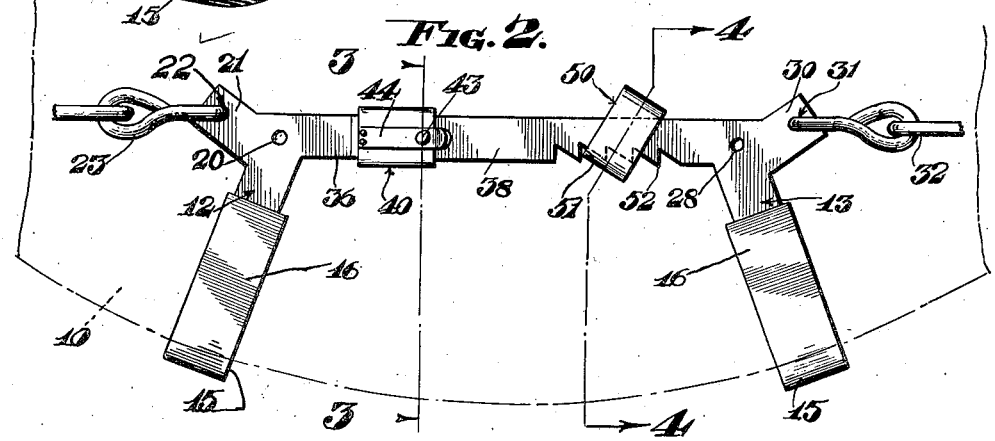
Fig. 2.
Fig. 3.                                              Fig. 4.
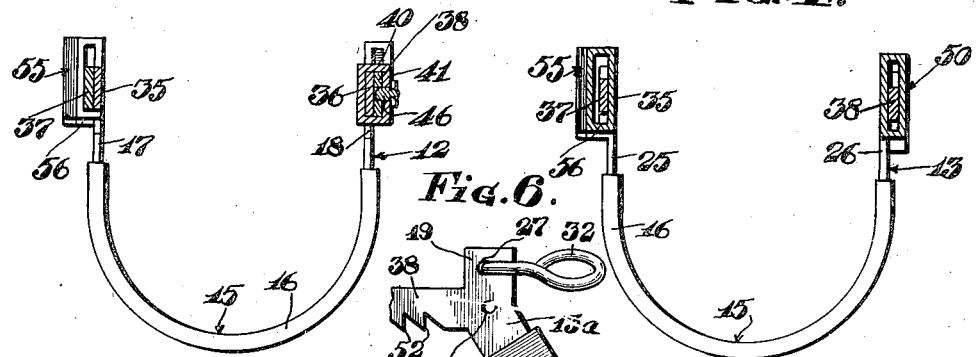
Fig. 6.
Fig. 5.
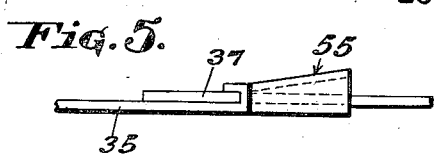
Inventor
G. W. Oakes.
By Munn, Anderson & Liddy
Attorney Patented July 15, 1941

2,249,665

UNITED STATES PATENT OFFICE 2,249,665

REMOVABLE TIRE CHAIN

George W. Oakes, Crystal City, Mo.

Application March 12, 1941, Serial No. 383,015

5 Claims. (Cl. 152—213)

This invention relates to a device for connecting skid chains to the wheels of automobiles.

An object of the invention is the provision of a device connected with the ends of the usual skid chain so that the chain may be readily applied to the tire of an automobile without requiring the raising of the wheel by the usual form of jack and without any inconvenience to the operator.

Another object of the invention is the provision of a device for connecting the ends of a skin chain together after the chain has been applied to the wheel with certain portions of the connecting means acting as anti-skid elements, the device being so constructed that when certain elements located exteriorly of the wheel are moved into operative and interlocked relation certain connecting elements at the interior face of the wheel will be alined and also interlocked.

A further object of the invention is the provision of a device for connecting the ends of a tire chain together in which U-shaped members are adapted to be placed around the tread and side walls of the tire without the necessity of raising the wheel from the ground, said U-shaped member being provided with arms which are adapted to be cooperatively alined and locked together with means on the arms at the exterior face of the wheel which when moved into alinement by guiding elements will cause the arms at the inner face of the wheel to be alined and to be moved into cooperative locking engagement.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a view in perspective of a connecting means for the ends of a skid chain showing the application of the connecting means to a tire.

Figure 2 is a side view in elevation of the connecting means shown in operative relation.

Figure 3 is a transverse vertical section taken along the line 3—3 of Figure 2.

Figure 4 is a vertical transverse section taken along the line 4—4 of Figure 2.

Figure 5 is a fragmentary plan view of a pair of connecting bars and a sleeve for retaining the bars in operative relation.

Figure 6 is a fragmentary view in elevation of a modified form of a chain attaching lug.

Referring more particularly to the drawing, 10 designates an inflated tire which is mounted upon a rim 11 of an automobile wheel.

A pair of U-shaped members, generally designated by the numerals 12 and 13 are made of metal and each U-shaped member is provided with a bight portion 15 adapted to engage around a tread of a tire. These bight portions will engage around a tread of the tire and thus form anti-skid elements. A rubber casing, generally designated by the numeral 16, may be mounted on the bight portions to prevent wear of the metal forming the said portions. The rubber covering may be vulcanized to the bight portions or this covering may be secured in any approved manner.

Legs 17 and 18 of the U-shaped member 12 engage around the side walls of the tire 10 and each free end of the legs is provided with a laterally projecting lug 21. These lugs are flat and extend outwardly from the legs at an angle to the side edges of said legs. Perforations 22 formed in the ends of the lugs are adapted to receive the ends of the tire chains 23 for a purpose which will be presently described. These legs at their upper ends have perforations 20 which may be utilized at times for receiving the ends of said chains.

Legs 25 and 26 of the U-shaped member 13 also engage the side walls of the tire 10 in spaced relation with the legs 17 and 18 of the U-shaped member 12. The upper ends of these legs are also provided with perforations 28 which receive the ends of a tire chain when the necessity arises. However, lugs 29 and 30 project outwardly from the legs 25 and 26 respectively and at an angle to a plane passing through the forward side edges of the U-shaped member and are provided with perforations 31 to receive the ends of the tire chains 32 for a purpose which will be presently described.

Projecting forwardly from the inner edges of the U-shaped member 12 are arms 35 and 36. Arms 37 and 38 project inwardly from the legs 25 and 26 of the U-shaped member 13 and are adapted to be alined respectively with the arms 35 and 36 of the U-shaped member 12 when the connecting means is in operative relation as shown in Fig. 2.

The tire 10, to which the U-shaped members 12 and 13 are applied in the drawing, is shown attached to the rear wheel of the vehicle at the right hand side so that when reference is made to the forward and rear portions of the U-shaped members, such reference is taken into consideration with respect to the front and rear portions of the vehicle. The chains are also applied to the other rear wheel and may be applied to the front wheels in practice.

The arm 36 has a sleeve 40 slidable thereon and the outer wall 41 of this sleeve is spaced from the outer face of the arm 36 in order that the free end of the arm 38 may be neatly received by the said sleeve when said arms are alined. It will be noted that the free end of the arm 38 is provided with a plurality of spaced perforations 42 which are adapted to be received by a pin 43 mounted on the spring member 44 which has one end secured at 45 to the outer face 41 of the sleeve 40. The pin projects through an opening 46 in the outer wall of the sleeve 40.

At one end of the arm 36 is secured a second sleeve 50 which is inclined at an angle to the upper edge of the arm 36 so that the bottom inner edge 51 of the sleeve is adapted to engage teeth 52 formed on the lower edge of the arm 38. The coaction between the teeth 52, the edge 51 of the sleeve 50 and the pin engaging the perforations 42 cooperate to removably secure the arm 38 to the arm 36.

The arm 35 is provided with a sleeve 55 having a reduced outer end and a flared inner end. Said sleeve is located at an obtuse angle to the upper edge of the arm 35. The flared inner end of the sleeve will facilitate the insertion of the free end of the arm 37 into said sleeve. This sleeve is formed by bending an extension of the arm 35 along three lines. The bottom edge 56 of the outer end of the sleeve 55 is adapted to be engaged by teeth 57 formed on the lower edge of the arm 37 for retaining the arms 35 and 37 in interlocked relation.

It will be seen that when the arms 38 and 36 are alined, the arms 35 and 37 will also be alined and when the U-shaped members 12 and 13 are moved toward each other the arm 37 will move through the flared inner end of the sleeve 55 on the arm 35. Thus, when the operator has applied the chains to the tire the arms 37 and 35 will be moved into alinement at the inner face of the wheel and be guided into operative relation when the arms 38 and 36 at the outer face of the wheel are alined and moved towards each other. In other words, the operator when applying the chains need only be concerned with the movement of the arms 36 and 38 since the proper alinement of these arms will also aline the respectively positioned arms 35 and 37. By this construction it is not necessary for the operator to get down on the floor when applying the connecting means in order to adjust or position any connecting means at the inner face of the wheel because the proper positioning of the arms 36 and 38 at the exterior of the wheel will automatically guide the inner arms into interlocking position.

In applying the tire chains to the tire it is only necessary for the operator to place the chain over the top of the tire at an intermediate point and then properly arrange the chains downwardly so that the U-shaped members 12 and 13 will be at the bottom of the wheel. The operator then moves the U-shaped members toward each other so that the free end of the arm 38 will enter the sleeve 50 at substantially a right angle to a plane passing through the open end of the sleeve. Since the sleeve 55 is at the same angle to the arm 35 the free end of the arm 38 will be automatically guided into the flared end of the sleeve 55. The U-shaped member is then tilted to bring the arms 37 and 38 in parallel relation with the respective arms 35, 36. The sleeve 40 is then slid over the alined arms and the spring pressed pin 43 will enter a perforation 42 in the arm 38 for retaining the sleeve in position on the arms while the sleeve retains the arms in parallel relation.

Since the inner end of the sleeve 55 is flared the free end of the arm 37 will be readily received by said sleeve, but both arms 37 and 38 must be in the tilted position shown in Fig. 1 in order that the arms may be passed readily through the sleeves 50 and 55 because the length of the sleeve 50 is such that it will not permit the arm 38 to be moved through the sleeve when said arm is in the horizontal position as shown in Fig. 2.

When the arms 37 and 38 are moved from the tilted positions, shown in Fig. 1, to the horizontal position, shown in Fig. 2, the teeth 52 of the arm 38 and the teeth 57 of the arm 37 will be respectively engaged by the lower edges 51 and 56 of the sleeves 50 and 55, and it will be impossible after the sleeve 40 has been moved onto the alined ends of the arms 36 and 38 for the two sets of arms to become disengaged from each other because the sleeve 40 cooperating with the teeth engaging with the edges of the sleeves 50 and 55 will retain the arms in operative relation.

When it is desired to remove the tire chain from the wheel the spring 44 is moved outwardly from the sleeve 40 so that the pin 43 will be moved from the perforation 42 in the arm 38 whence said sleeve may be moved out of operative relation with the alined arms 36 and 38. The arms 37 and 38 are then tilted to the position shown in Fig. 1 whereby said arms may be withdrawn from the sleeves 50 and 55.

In Fig. 6 is shown a modified form of the invention in which a lug 19 located at a right angle to each of the arms 35, 36 and 37, 38 is provided with a perforation 27 to receive an end of the chain 23 or 32 as the case may be. The disposition of the lugs 19 with respect to the arms will give substantially the same results as the lugs 21, 29 and 30.

While I have shown lugs 21 and 30 located at an angle and projecting laterally from the U-shaped members 12 and 13 respectively, and while I have shown a lug 19 (Fig. 6) as being located in a vertical position, nevertheless, it will be appreciated that these lugs may project above the two groups of arms and in alinement with the legs of the U-shaped members. These lugs naturally would be provided with perforations to receive the ends of the chains. In other words, the lugs 21 and 30, shown in Figs. 1 and 2 may assume various angular positions with respect to the legs of the U-shaped members 12 and 13 to provide means for attaching the ends of the chains to said U-shaped members.

I claim:

1. A tire chain connector comprising a pair of U-shaped members adapted to engage around a tire, lugs projecting from the upper ends of the legs of the U-shaped members and inclined to a plane passing through the adjacent edges of the legs, said lugs having means for connecting the ends of the chain thereto, rods projecting from the opposite edges of each of the legs, the arms on one U-shaped member extending towards the arms projecting from the legs of the other U-shaped member and cooperating means on the arms for connecting the arms together.

2. A tire chain connector comprising a pair of U-shaped members adapted to engage around a tire, lugs projecting from the upper ends of the legs of the U-shaped members and inclined to the edges of the legs at one side of said U-shaped members, arms projecting from the opposite side edges of the legs, the ends of the chain being connected to the lugs, the arms extending from one U-shaped member adapted to be alined with the arms of the other U-shaped member, cooperating means on the alined arms of one pair for removably connecting the arms together, spaced means on the alined arms of the other pair removably connecting the arms together, the inclination of the lugs aiding in the maintaining the connecting means in operative relation.

3. A tire chain connector comprising a pair of U-shaped members adapted to engage around a tire with the bight portion embracing the tread and with the legs thereof engaging the side walls of said tire, the free ends of the legs having means for connecting the ends of the chain to said legs, arms on each of the legs, the arms on one of the U-shaped members projecting towards and alining with the arms on the other U-shaped member, cooperating means on one pair of the alined arms for retaining said arms in interlocked engagement, spaced means on the other pair of alined arms for not only retaining said arms in interlocked relation but for aiding in retaining the first-mentioned arms in position to maintain the interlocked engagement.

4. A tire chain connector comprising a pair of U-shaped members adapted to engage around a tire with the bight portion embracing the tread and with the legs thereof engaging the side walls of said tire, the free ends of the legs having means for connecting the ends of the chain to said legs, arms on each of the legs, the arms on one of the U-shaped members projecting towards and alining with the arms on the other U-shaped member, cooperating means on one pair of the alined arms for retaining said arms in interlocked engagement, cooperating means on the other pair of alined arms for retaining said arms in interlocked relation, a sleeve on one of the last-mentioned pair of arms receiving the free end of the other arm of said pair and cooperating means on the sleeve and free end of said arm for retaining the last-mentioned arms in interlocked relation.

5. A tire chain connector comprising a pair of U-shaped members adapted to engage around a tire with the bight portions embracing the tread and with the legs thereof engaging the side walls of said tire, said bight portions cooperating with the chain to form anti-skid elements, the free ends of the legs having means for connecting the ends of the chain to said legs, arms on each of the legs, the arms on one of the U-shaped members projecting towards and alining with the arms on the other U-shaped member, means at the free end of one arm of a U-shaped member located at the inner face of a wheel adapted to receive the free end of an adjacently disposed arm on the other U-shaped member, spaced means on one arm located exteriorly of the wheel to receive the other exteriorly located arm for alining said arms and likewise the interiorly located arms, and cooperating means on the exteriorly located arms for removably connecting the arms together.

GEORGE W. OAKES.